(12) United States Patent
Kim et al.

(10) Patent No.: US 7,456,310 B2
(45) Date of Patent: Nov. 25, 2008

(54) DISPERSANT FOR DISPERSING CARBON NANOTUBES AND CARBON NANOTUBE COMPOSITION COMPRISING THE SAME

(75) Inventors: Kwang Hee Kim, Seoul (KR); Jae Young Choi, Gyeonggi-do (KR); Seon Mi Yoon, Gyeonggi-do (KR); Hyuk Soon Choi, Gyeonggi-do (KR); Hyo Sug Lee, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 182 days.

(21) Appl. No.: 11/562,450

(22) Filed: Nov. 22, 2006

(65) Prior Publication Data

US 2007/0221094 A1    Sep. 27, 2007

(30) Foreign Application Priority Data

Jan. 20, 2006    (KR) .................. 10-2006-0006314

(51) Int. Cl.
*C07C 69/00* (2006.01)
*B01F 3/00* (2006.01)

(52) U.S. Cl. .................................. 560/141; 252/363.5
(58) Field of Classification Search ................ 560/141; 252/363.5
See application file for complete search history.

(56) References Cited

U.S. PATENT DOCUMENTS

| | | | |
|---|---|---|---|
| 6,766,817 B2 | 7/2004 | da Silva | |
| 6,918,404 B2 | 7/2005 | Dias da Silva | |
| 7,066,586 B2 | 6/2006 | da Silva | |
| 7,285,255 B2 | 10/2007 | Kadlec et al. | |
| 2005/0240051 A1* | 10/2005 | Yasuda et al. | 560/140 |
| 2006/0189822 A1* | 8/2006 | Yoon et al. | 560/130 |

FOREIGN PATENT DOCUMENTS

| | | |
|---|---|---|
| KR | 1020010102598 A | 11/2001 |
| KR | 1020030086442 A | 11/2003 |
| KR | 10020050097711 A | 10/2005 |

OTHER PUBLICATIONS

Abstract for Korean Patent Publication No. 1020010102598A, 2001.
Abstract for Korean Patent Publication No. 1020050097711A, 2005.
Abstract for Korean Patent Publication No. 1020030086442A, 2003.
Islam et al., "High Weight Fraction Surfactant Solubilization of Single-Wall Carbon Nanotubes in Water", 2003 American Chemical Society, published on Web Jan. 16, 2003.

* cited by examiner

*Primary Examiner*—Mark Eashoo
*Assistant Examiner*—Angela C Scott
(74) *Attorney, Agent, or Firm*—Cantor Colburn LLP

(57) ABSTRACT

Disclosed herein is a cyclic dispersant having a rigid block which has a high affinity for carbon nanotubes, and a flexible block which has a high affinity for a solvent, with a linkage created therebetween. Having a structure that is advantageous with respect to adsorption to carbon nanotubes, the dispersant, even if used in a small amount, can disperse a large amount of carbon nanotubes.

10 Claims, 8 Drawing Sheets

DISPERSANT FOR DISPERSING CARBON NANOTUBES AND CARBON NANOTUBE COMPOSITION COMPRISING THE SAME

This application claims priority to Korean Patent Application No. 10-2006-0006314, filed on Jan. 20, 2006, and all the benefits accruing therefrom under 35 U.S.C. § 119, the contents of which are herein incorporated by reference in its entirety.

BACKGROUND OF THE INVENTION

1. Field of the Invention

The present invention relates to a dispersant for dispersing carbon nanotubes and a carbon nanotube composition comprising the same. More particularly, the present invention relates to a dispersant having a rigid linear block and a flexible block with a link imparted therebetween, which is so highly adsorptive onto carbon nanotubes that it prevents the aggregation of carbon nanotubes, thereby increasing the dispersibility of the carbon nanotubes, and a carbon nanotube composition comprising the same.

2. Description of the Related Art

A carbon nanotube is honeycomb lattice rolled into a cylinder, in which one carbon atom is connected with others in a hexagonal pattern. Having a diameter on the order of a few nanometers, a carbon nanotube exhibits characteristic electrochemical properties as well as excellent mechanical properties. For example, carbon nanotubes are known to have high electrical selectivity, excellent field emission properties and highly efficient hydrogen storage properties. The structure of a nanotube strongly affects its electrical properties, that is, whether it is metallic or semiconducting, and its energy gap depends on the tube diameter. Having a quasi-one dimensional structure, in addition, a carbon nanotube exhibits characteristic quantum effects. Owing to these characteristics, interest in the fundamental properties and potential applications thereof has been rapidly growing, particularly in electronics, bio-engineering, and medicine.

For instance, carbon nanotubes find use in various fields of electroconductive films, field emission displays (FED), scanning probe microscopes (SPM), and the like, and are actively and extensively studied.

For use in the formation of electroconductive films or the fabrication of various electronic devices, carbon nanotubes need to be effectively dispersed in matrices such as solutions or binders. However, carbon nanotubes exhibit a great tendency to aggregate in bundles in a matrix owing to Van der Waals forces. When aggregated in a matrix, carbon nanotubes cannot exhibit the characteristic properties thereof and cannot be formed into a film having uniform properties throughout.

This strong tendency toward aggregation makes it difficult to sufficiently disperse carbon nanotubes in a matrix using commercially available dispersants. Extensive attempts have been made to develop novel dispersants and methods to uniformly disperse carbon nanotubes in solvents or binders.

For instance, a method of introducing an alkyl group into a carbon nanotube using a chemical linkage has been disclosed. An alkyl group having 8 or more carbon atoms can increase the solubility of carbon nanotubes in organic solvents to hundreds of parts per million (ppm), but adds an insulation value, thereby decreasing electroconductivity. One the other hand, a smaller alkyl group cannot increase solubility to the desired extent.

A method of wrapping carbon nanotubes with a polymer which is physically interactive with the nanotubes, thereby increasing the solubility thereof, has also been disclosed. However, the carbon nanotubes wrapped with the polymer are disconnected from each other, so that the electroconductivity thereof is low. Further, when the coating thereof is not perfect, the polymers and the carbon nanotubes both aggregate, leading to a decrease in dispersion.

Also disclosed is a technique wherein a functional group selected from among cyan, amine, hydroxy, carboxyl, halide, nitrate, thiocyan, thiosulfate, vinyl, and combinations thereof is attached to carbon nanotubes. This method, however, damages the surface of carbon nanotubes to the extent of degrading the electrical properties thereof.

Linear dispersants, such as sodium dodecylbenzene sulfonates (NaDDSS), sodium dodecyl sulfate (SDS), and the like, including the diblock type dispersant shown in FIG. 6a, are known to disperse carbon nanotubes. However, these dispersants are disadvantageous in that they are difficult to adsorb on the surface of carbon nanotubes owing to the linear structure thereof.

Also, triblock type dispersants, such as a,w-dioligoethyleneglycol-oligothiophene (FIG. 6b) have been introduced. Having a strong tendency toward self-aggregation to form micelles, these dispersants adsorb only weakly onto carbon nanotubes and thus show only limited effects of improving the dispersibility thereof.

BRIEF SUMMARY OF THE INVENTION

The present invention overcomes the above-described problems occurring in the prior art, and an aspect of the present invention includes providing a dispersant for carbon nanotubes, which can minimize or effectively prevent the aggregation of carbon nanotubes and thus improve the dispersibility of carbon nanotubes in a matrix.

Another aspect of the present invention includes providing a carbon nanotube composition in which carbon nanotubes are highly dispersed, thereby assuring their properties.

In accordance with one exemplary embodiment of the present invention, a cyclic dispersant includes a rigid block and a flexible block, with a link imparted therebetween, the rigid block being a π-conjugated oligoarylene, represented by Chemical Formula 1 or 2, the flexible block being a polyacrylate or polyethylene oxide.

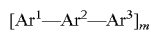  [Chemical Formula 1]

wherein, $Ar^1$, $Ar^2$ and $Ar^3$ are each independently an aryl selected from the group consisting of phenyl, naphthyl, pyrenyl, anthryl, perylenyl and triphenylenyl; and m is an integer from 1 to 4.

  [Chemical Formula 2]

wherein $Ar^1$ and $Ar^2$ are each independently an aryl selected from the group consisting of phenyl, naphthyl, pyrenyl, anthryl, perylenyl, diphenylenyl, triphenylenyl, tetraphenylenyl, pentaphenylenyl, and hexaphenylenyl; and L is selected from the group consisting of ethylene, allene, and a heteroaromatic hydrocarbon having 5 to 30 carbon atoms.

In the dispersant, the rigid block can be selected from the group consisting of derivatives of oligophenylene, oligothiophene, oligovinylphenylene, and benzene furan. The flexible block that has an affinity for solvents can be selected from the group consisting of polymethylmethacrylate, polybutylacrylate, polyacrylic acid, polymethacrylic acid, and a copolymer of polyalkylmethacrylate and polymethacrylic acid, polyoxyethylene, polyoxypropylene, polyvinylalcohol, and polyacrylamide.

In accordance with another exemplary embodiment of the present invention, a carbon nanotube composition includes the dispersant, a carbon nanotube and a solvent.

BRIEF DESCRIPTION OF THE DRAWINGS

The above and other aspects, features and advantages of the present invention will be more clearly understood from the following detailed description taken in conjunction with the accompanying drawings, in which.

DETAILED DESCRIPTION OF THE INVENTION

Figure 1:
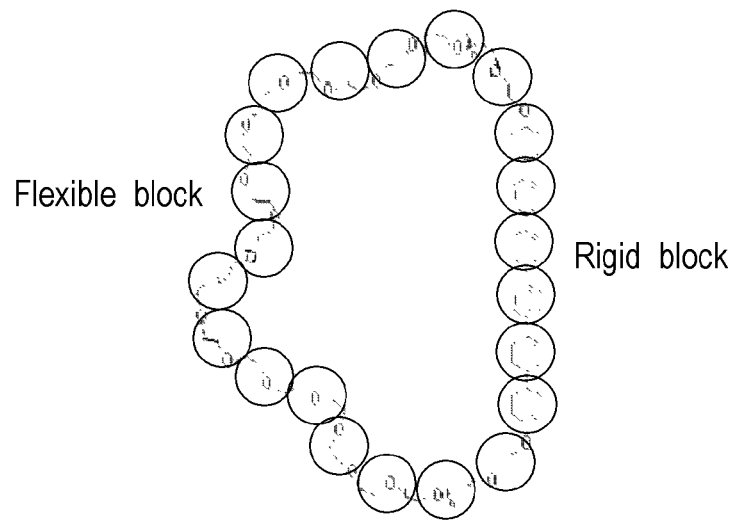
FIG. 1 is a schematic illustration of an exemplary embodiment of a dispersant according to the present invention.

The present invention will now be described more fully hereinafter with reference to the accompanying drawings, in which exemplary embodiments of the present invention are shown. This invention may, however, be embodied in many different forms and should not be construed as limited to the exemplary embodiments set forth herein. Rather, these exemplary embodiments are provided so that this disclosure will be thorough and complete, and will fully convey the scope of the invention to those skilled in the art. Like reference numerals refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
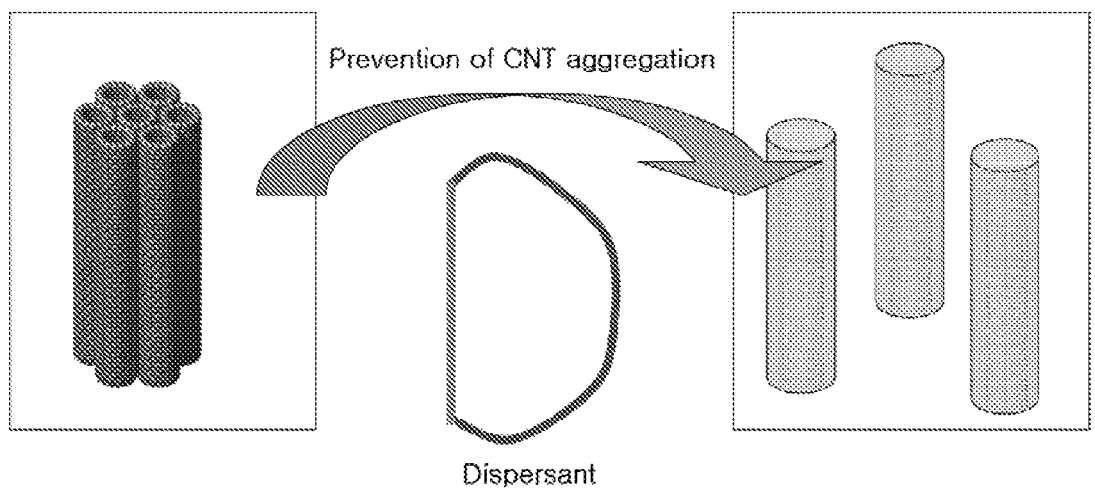
FIG. 2 is a schematic illustration of an exemplary embodiment of the dispersant operating according to the present invention.
Figure 6A:
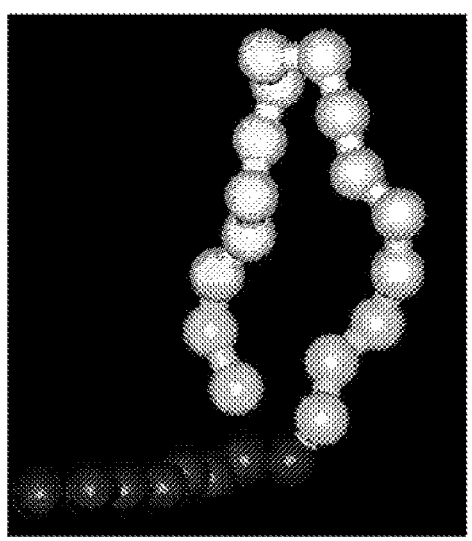
FIGS. 6a to 6c are photographs of models of a di-block type, a tri-block type, and a cyclic dispersant, respectively.
Figure 6B:
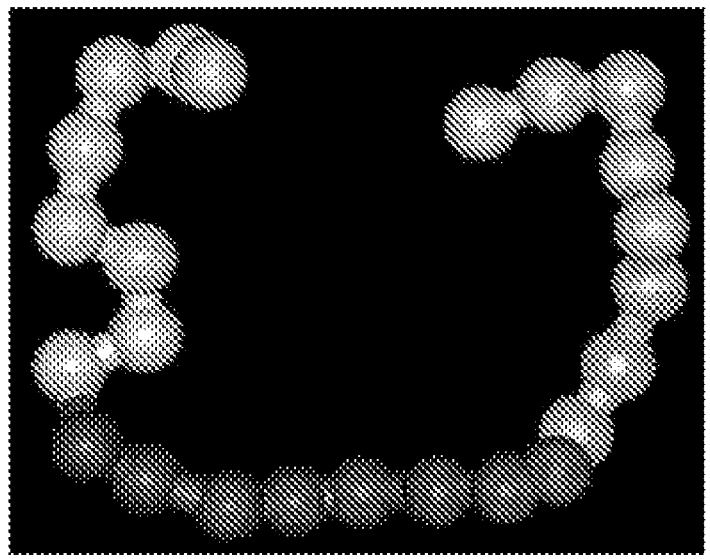
Figure 6C:
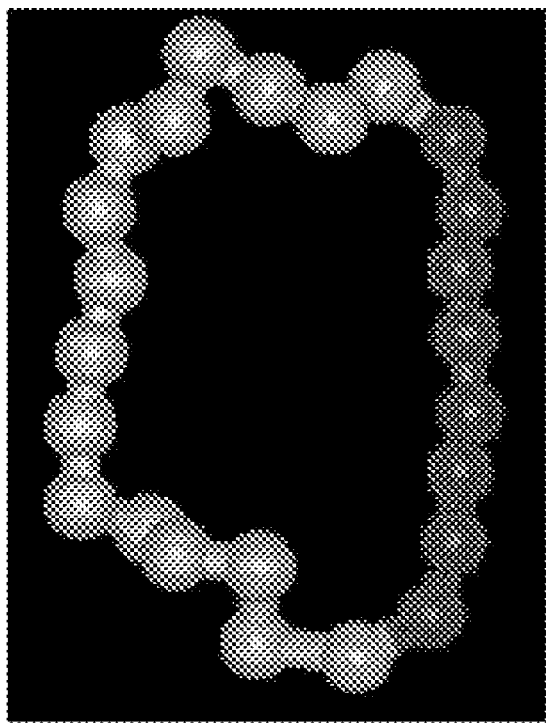

The cyclic dispersant of the present invention, as shown in FIG. 1, includes a rigid block capable of strongly interacting with the surface of a carbon nanotube (CNT), and a flexible block, linked to both ends of the rigid block, having a branched chain. A schematic view of the cyclic dispersant of the present invention is given in FIG. 6c. The dispersant, as illustrated in FIG. 2, restrains carbon nanotubes from aggregating in a solvent so that they can be dissolved without degrading the electroconductivity thereof.

In one embodiment, the cyclic dispersant consists of a the rigid block and the flexible block, linked to both ends of the rigid block, having a branched chain.

The rigid block of the cyclic dispersant according to the present invention is a π-conjugated oligoarylene, represented by Chemical Formula 1 or 2. Having aromatic hydrocarbons, the rigid block is similar in structure to a carbon nanotube The π-π bond formed between the carbon nanotube and the rigid block of the dispersant gives the dispersant high affinity for carbon nanotubes.

$[Ar^1—Ar^2—Ar^3]_m$      [Chemical Formula 1]

wherein, $Ar^1$, $Ar^2$ and $Ar^3$ are each independently an aryl group selected from the group consisting of phenyl, naphthyl, pyrenyl, anthryl, perylenyl and triphenylenyl, and m is an integer from 1 to 4.

$Ar^1$-L-$Ar^2$      [Chemical Formula 2]

wherein $Ar^1$ and $Ar^2$ are each independently an aryl group selected from the group consisting of phenyl, naphthyl, pyrenyl, anthryl, perylenyl, diphenylenyl, triphenylenyl, tetraphenylenel, pentaphenylenyl, and hexaphenylenyl, and L is selected from the group consisting of ethylene, allene and a heteroaromatic hydrocarbon having 5-30 carbon atoms.

Figure 3A:
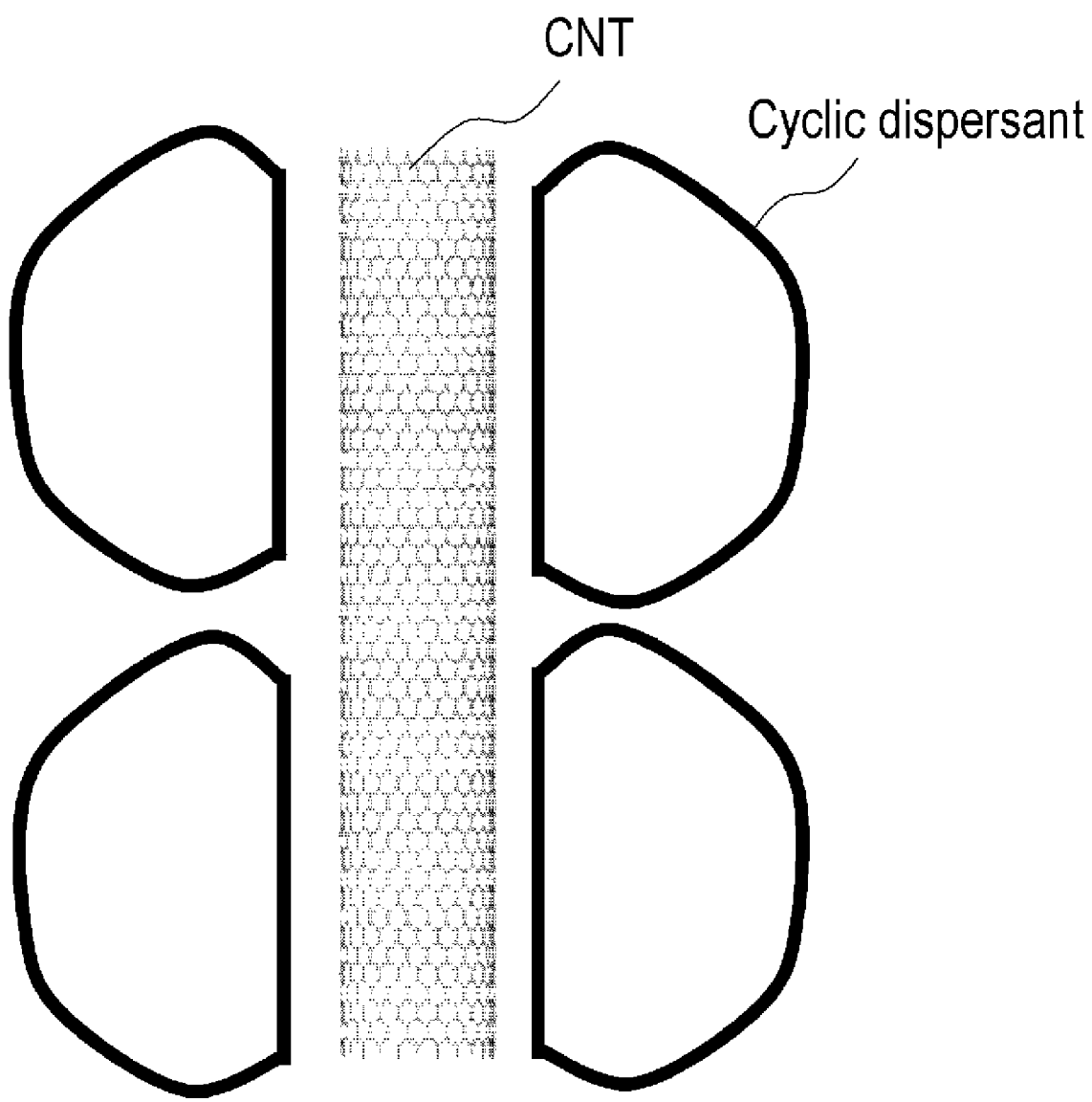
FIGS. 3a and 3b are schematic illustrations of the adsorption of cyclic dispersants on a carbon nanotube.
Figure 3B:
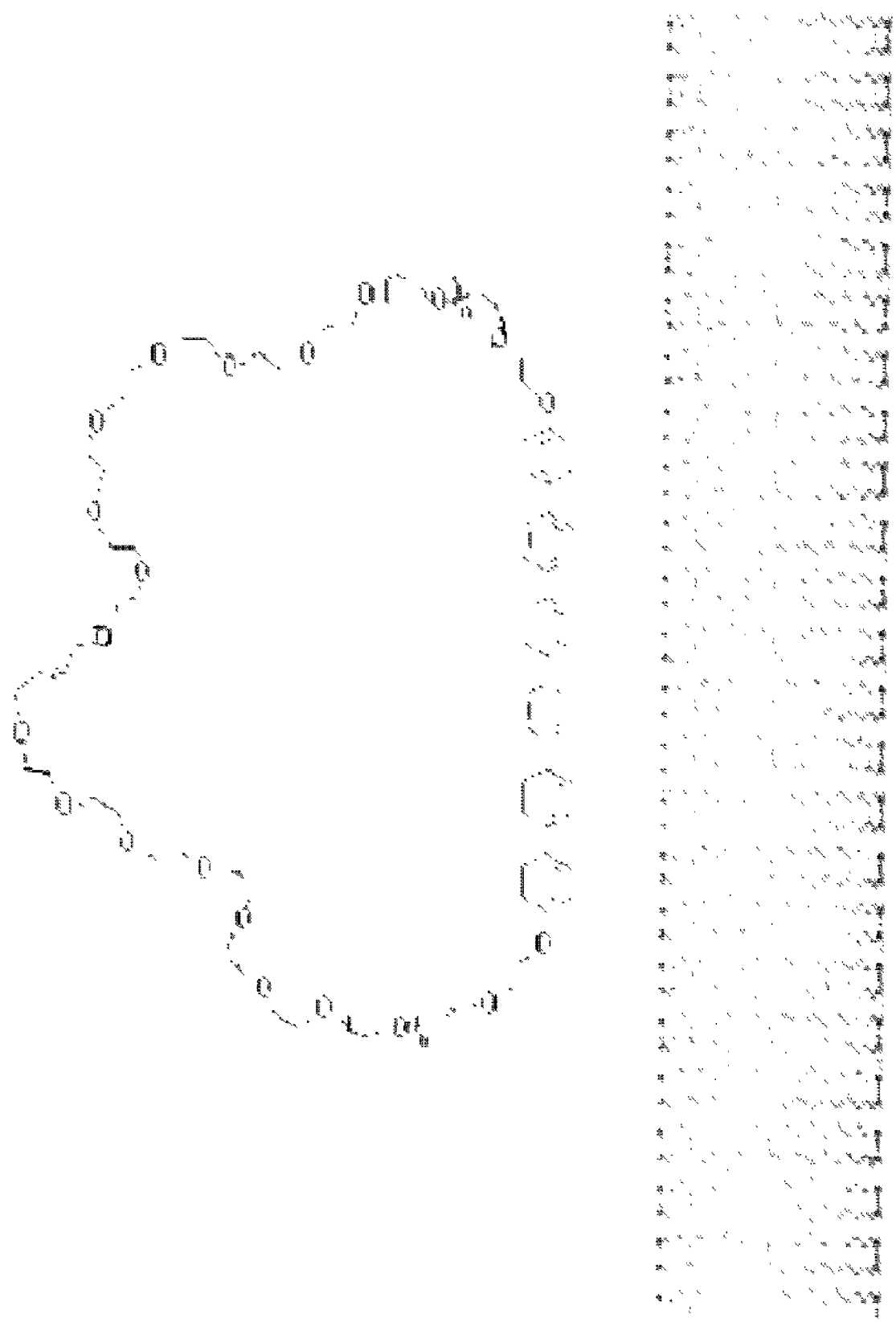
Figure 4:
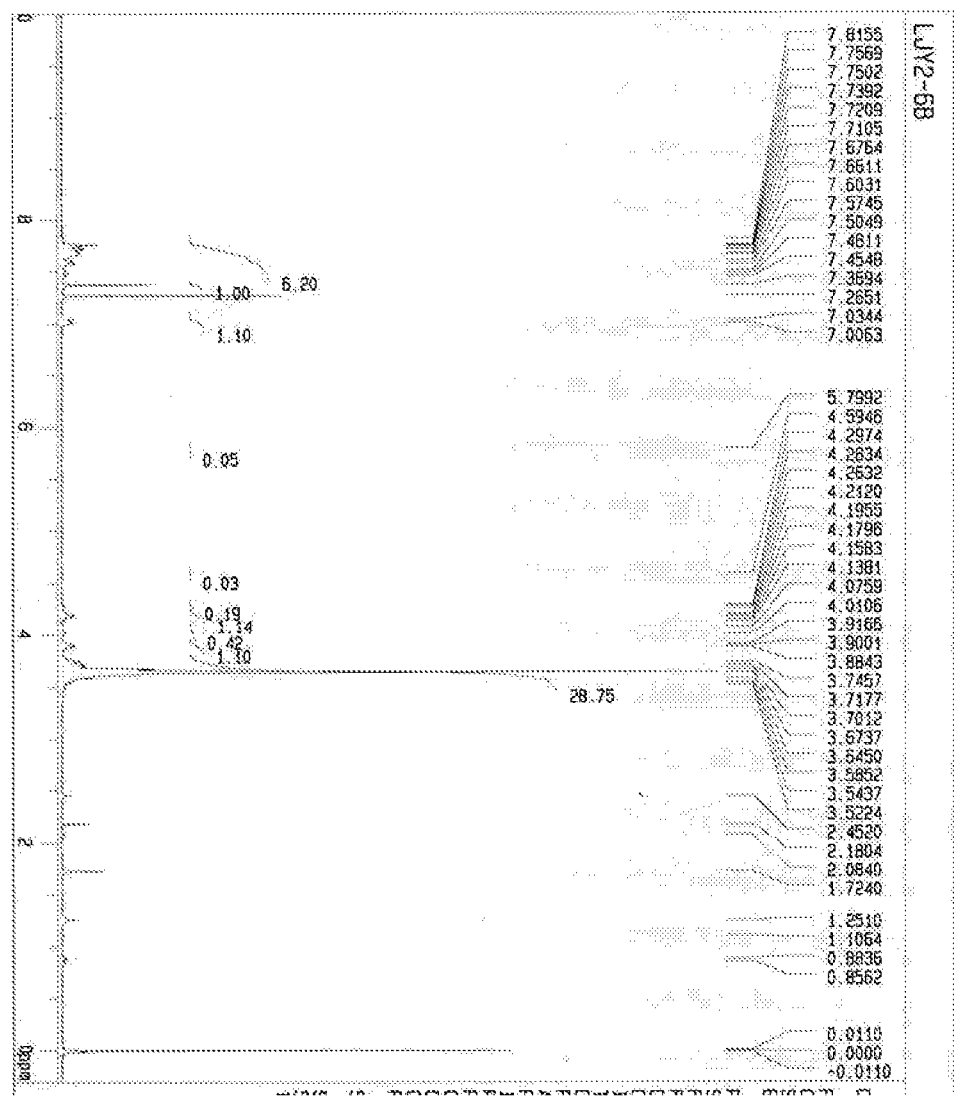
FIG. 4 is a proton nuclear magnetic resonance ($^1$H-NMR) spectrum of the exemplary dispersant of Chemical Formula 5.

Referring now to FIGS. 3a and 3b, wherein the operational mechanism of the dispersant of the present invention is schematically illustrated, by which carbon nanotubes are dispersed in a matrix. From the fact that the rigid block of the dispersant is adsorbed on the surface of a carbon nanotube through a π-π interaction therebetween, as shown in FIG. 3a, it can be inferred that the carbon nanotube can be solubilized. While the rigid blocks are aligned along the carbon nanotube, the flexible blocks face the solvent owing to the high solvent affinity thereof. As seen in FIG. 3b, individual carbon nanotubes are wrapped with the dispersant and stabilized in the solvent in such a way that the hydrophilic flexible block is in contact with the solvent while the hydrophobic rigid block is in contact with the carbon nanotube. Accordingly, the cyclic dispersant of the present invention can prevent carbon nanotubes from forming self-aggregates.

Exemplary π-conjugated oligoarylenes constituting the rigid block of the dispersant include, but are not limited thereto, oligophenylene, oligothiophene, oligovinylphenylene, and benzene furan derivatives.

The choice of flexible block linked to the rigid block of the dispersant will depend on the dispersion medium employed. As long as it has an affinity for the dispersion medium, any flexible block may be used. It may be a polyacrylate or polyethylene oxide-based moiety.

Exemplary solvent-affinitive flexible blocks useful in the present invention include, but are not limited to, polymethylmethacrylate, polybutylacrylate, polyacrylic acid, polymethacrylic acid, a copolymer of polyalkylmethacrylate and polymethacrylic acid, polyoxyethylene, polyoxypropylene, polyvinylalcohol, and polyacrylamide.

In an exemplary embodiment, the length ratio of the rigid block adsorbed to the surface of the carbon nanotubes to the flexible block is about 1:2 to about 1:4. If the length ratio departs from this range, that is, if the flexible block or the rigid block is too long, the dispersant molecule may be only weakly adsorbed to the carbon nanotubes.

Exemplary cyclic dispersants of the present invention are represented by Chemical Formulas 3 to 5.

[Chemical Formula 3]

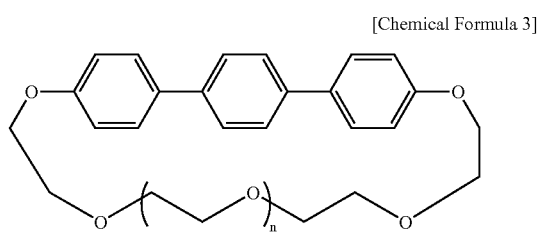

wherein n is an integer from 3 to 6.

[Chemical Formula 4]
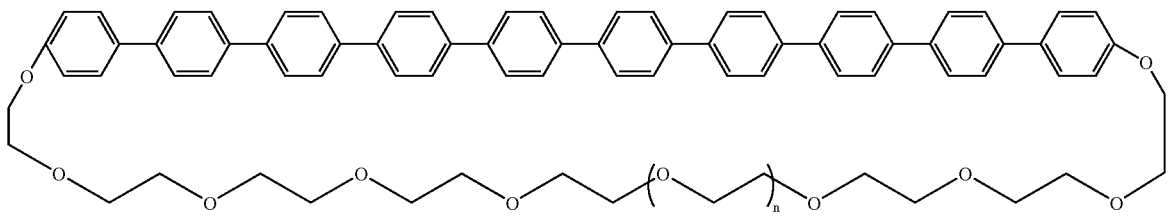
wherein n is an integer from 7 to 15.
[Chemical Formula 5]
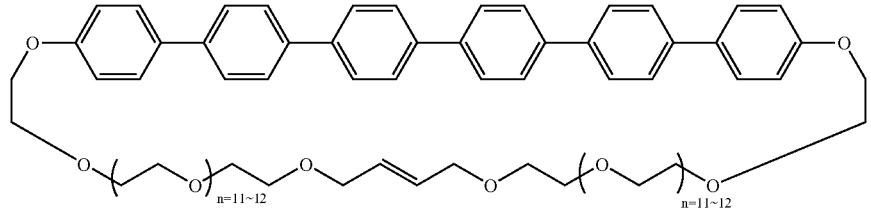
In a specific dispersant represented by Chemical Formula 5, hexaphenylene acts as the rigid block while polyethylene oxide constitutes the flexible block, as shown in Chemical Formula 6.
[Chemical Formula 6]
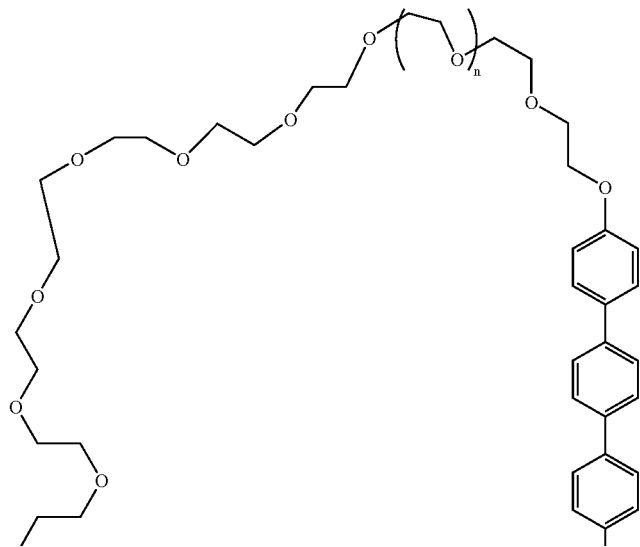

-continued

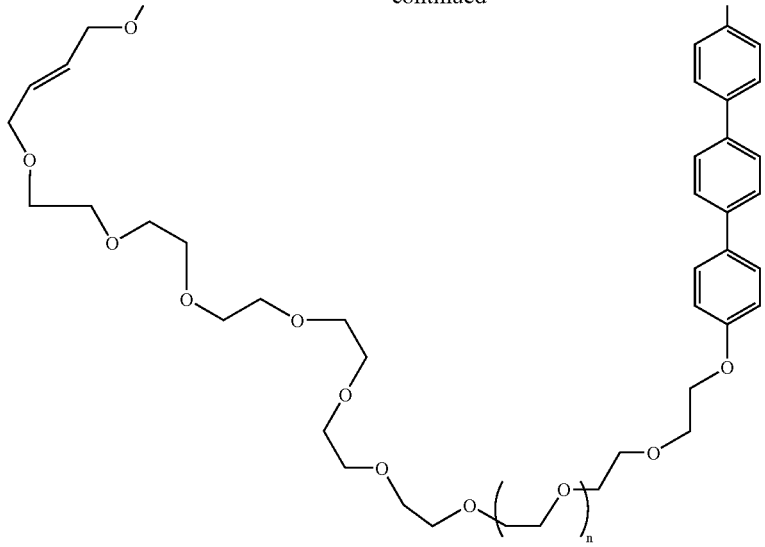

wherein, n is 11.

The synthesis of the dispersant of the present invention is now described, with reference to the compound of Chemical Formula 6. As described above, the dispersant of Chemical Formula 6 is a macrocyclic ring in which the rigid block, hexaphenylene, is linked at opposite ends with the flexible block, poly(ethylene)oxide. Precursors of the macrocyclic ring can be prepared by etherizing corresponding poly(ethylene)oxide-terminated hexaphenylenes with an aryl chloride. While being fluxed with a dichloromethane solution, these precursors can be converted into the macrocyclic forms of interest through ring-closing metathesis (RCM) reactions.

A carbon nanotube composition comprises a carbon nanotube, the dispersant of the present invention, and a solvent. Carbon nanotube films prepared from the composition in which carbon nanotubes are uniformly dissolved in the solvent with the aid of the dispersant can find a broad variety of applications including transparent conductive films, organic solar cells, electrode materials for batteries, and the like.

The carbon nanotube composition of the present invention comprises the dispersant in an amount from about 0.001 to about 10 weight percent (wt %), carbon nanotubes in an amount from about 0.01 to about 5 wt %, with the balance of the weight of the composition being a solvent. In an exemplary embodiment, the carbon nanotubes are mixed in a weight ratio of about 1:0.001 to about 1:10 with the dispersant. The carbon nanotube composition of the present invention may further comprise a binder and/or other organic additives.

The carbon nanotube may be selected from, but is not limited to, a single wall carbon nanotube, a double-wall carbon nanotube, a triple-wall carbon nanotube, a quadruple-wall carbon nanotube, a carbon nanohorn, a carbon nanofiber, and combinations thereof.

Exemplary solvents include water; alcohols such as methanol, ethanol, isopropyl alcohol, propyl alcohol, butanol, and the like; ketones such as acetone, methylethyl ketone, ethyl isobutyl ketone, methyl isobutyl ketone, and the like; ethylene glycols such as ethylene glycol, ethylene glycol methylether, ethylene glycol mono-n-propylether, and the like; propylene glycols such as propylene glycol, propylene glycol methylether, propylene glycol ethylether, propylene glycol butylether, propylene glycol propylether, and the like; amides such as dimethylformamide, dimethylacetamide, and the like; pyrrolidones such as N-methylpyrrolidone, N-ethylpyrrolidone, and the like; hydroxyesters such as dimethylsulfoxide, γ-butyrolactone, lactic acid methyl, lactic acid ethyl, β-methoxyisobutyric acid methyl, α-hydroxyisobutyric acid methyl, and the like; anilines such as aniline, N-methylaniline, and the like; hexane; terpineol; chloroform; toluene; propylene glycol monomethyl ether acetate (PGMEA); and N-methyl-2-pyrrolidone (NMP), but are not limited thereto.

Using a mixing or a kneading apparatus, such as an ultrasonicator, a homogenator, a spiral mixer, a planetary mixer, a disperser, a blending mixer, or the like, the carbon nanotube and the dispersant may be mixed in the solvent.

Having the ability to disperse the carbon nanotubes in a matrix, such as a solution or a binder, without degrading electrical and optical properties of the carbon nanotubes themselves, the carbon nanotube composition of the present invention enjoys the advantage of having superior conductivity, film formation, and moldability in addition to showing excellent dispersion stability, such that the carbon nanotubes are neither separated from the solvent nor aggregate for a long period of time.

A simple coating technique, such as spin coating, electrophoretic deposition, inkjet printing, and the like, may be used to dispose the carbon nanotube composition of the present invention onto a substrate. Applications of the carbon nanotube composition of the present invention may be found in electron guns or electrodes for field emission displays (FEDs), transparent electrodes for FEDs or liquid crystal displays (LCDs), luminescent materials, buffering materials, electron transporting materials, and hole transporting materials for organic electroluminescent devices, and the like.

Hereinafter, the present invention will be carried in detail with reference to examples. It is to be understood, however, that these examples are for illustrative purposes only and are not to be construed to limit the scope of the present invention.

EXAMPLES

Synthesis Example

Dispersant Synthesis

A dispersant represented by Chemical Formula 5 was synthesized according to reaction scheme 1 shown below. To a solution of p-toluenesulfonyl chloride in dry methylene chloride were added poly(ethylene) glycol ($M_n$=600) and pyridine at about 0 degrees Celsius (° C.). In an argon atmosphere, the mixture was mixed for about 8 hours at room temperature. The addition of a hydrochloric acid solution (5 wt %) to the reaction mixture was followed by extraction with methylene chloride. The organic phase was washed with water and dried over magnesium sulfate before evaporating the solvent in a vacuum. The crude product thus obtained was purified by silica gel column chromatography using methylene chloride/methanol (40:1 to 30:1 volume/volume) as an eluent to afford Compound A as a colorless oil (Yield: 56%).

Compound A, 4'-bromo-[1,1'-biphenyl]-4-ol, and excess $K_2CO_3$ were dissolved in anhydrous acetonitrile. The mixture was fluxed for about 24 hours, diluted with water and extracted with methylene chloride. The extract was washed with water, dried over anhydrous magnesium sulfate, and filtered. Following the removal of the solvent using a rotary evaporator, the crude product was purified by silica gel column chromatography using methylene chloride/methanol (40:1 to 30:1 v/v) as an eluent to afford Compound B as a waxy solid (Yield: 90%)

In de-aerated THF were dissolved Compound B and 4,4'-biphenyldiboronic acid. To this solution were added a 2 mole per liter (M) de-aerated $Na_2CO_3$ solution and then tetrakis (triphenyl-phosphine) palladium(0). The resulting mixture was fluxed for about 24 hours with vigorous stirring. Cooling to room temperature resulted in layer separation. The aqueous layer thus formed was washed twice with methylene chloride. After being pooled, the organic layer was dried over anhydrous magnesium sulfate and filtered. After the removal of the solvent using a rotary evaporator, the crude product was purified by silica gel column chromatography using methylene chloride/methanol (20:1 v/v) as an eluent to afford Compound C as a waxy solid (Yield: 52%).

Compound C, allyl bromide, and NaOH were refluxed for about 16 hours in benzene. The resulting pale yellow solution was cooled to room temperature, combined with a 5 wt % hydrochloric acid solution and extracted with methylene chloride. The organic layer thus formed was dried over anhydrous magnesium sulfate and evaporated to dryness in a vacuum. The crude product was purified by a silica gel chromatography using methylene chloride/methanol (40:1 to 30:1 v/v) as an eluent to afford Compound D as a waxy solid (Yield: 56%).

While being refluxed for about 21 hours in methylene chloride, Compound D was reacted with 10 mol % Grubb's catalysts. Following the removal of the solvent using a rotary evaporator, the crude product was purified by silica gel column chromatography using methylene chloride/methanol (40:1 to 30:1 v/v) as an eluent to afford Compound F as a waxy solid (Yield: 59%).

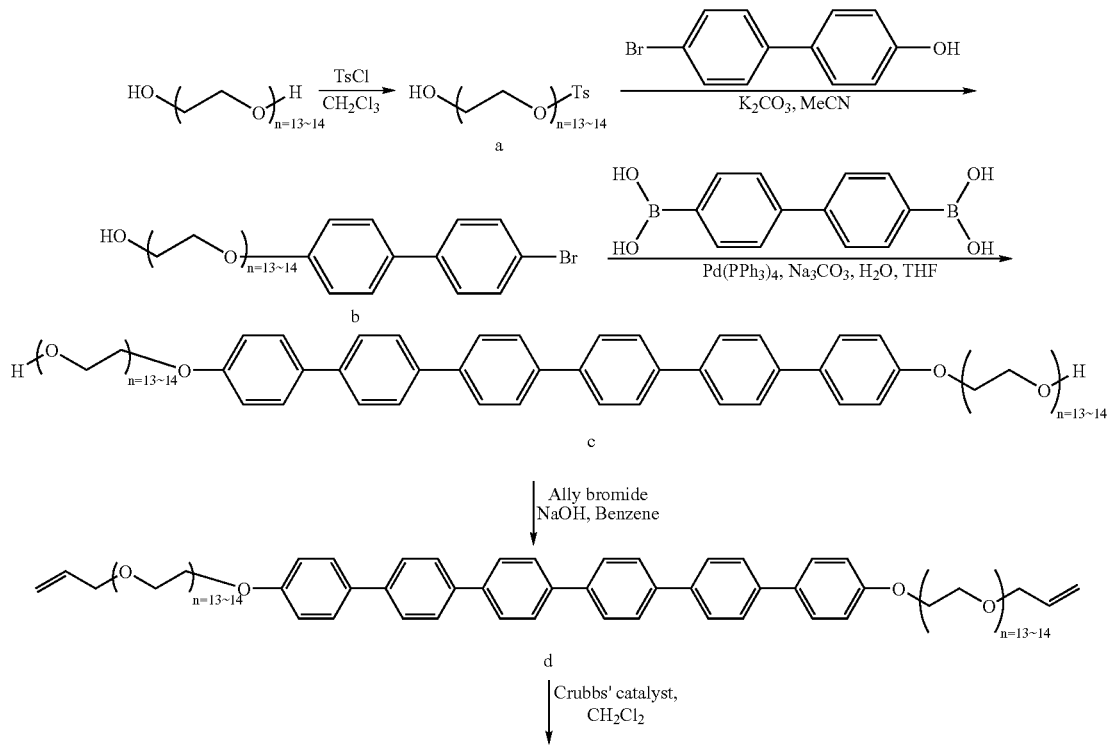

[Reaction Scheme]

-continued

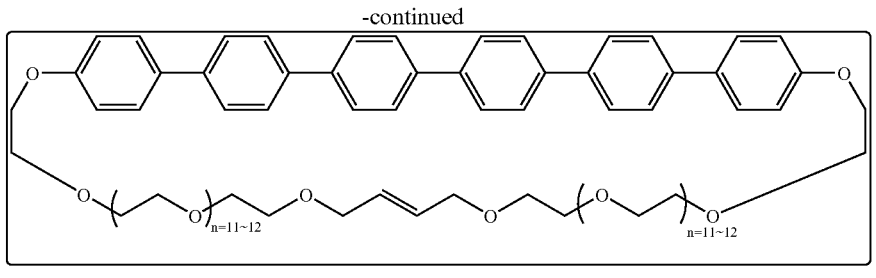

f

Example

Figure 5:
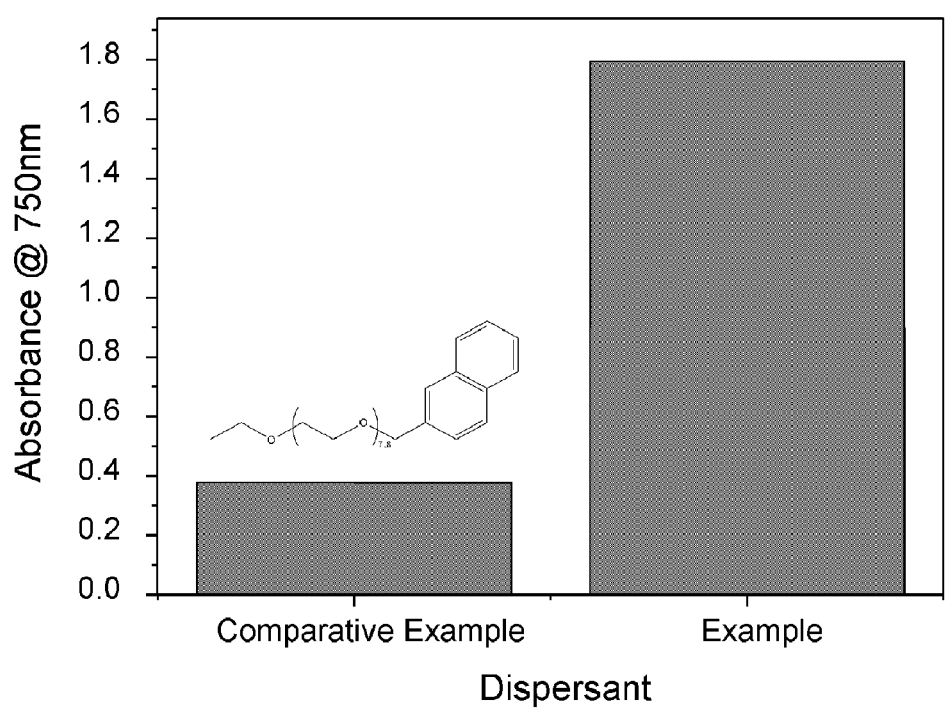
FIG. 5 is a graph showing the absorbance at 750 nanometers (nm) of two dispersants.

About 20 milligrams (mg) of the dispersant of Chemical Formula 5, obtained in the Synthesis Example, revolutions dissolved in about 20 grams (g) of terpineol. To this solution was added 2 mg of multi-wall carbon nanotubes, which were then dispersed for about 10 hours in a sonic bath. Next, centrifugation at about 5,000 revolutions per minute (rpm) for about 5 minutes yielded a carbon nanotube solution as a supernatant. The solution was measured for absorbance at 750 nanometers (nm) using UV-Vis spectroscopy (JASCO V-560) (Absorbance mode, Scanning speed: 400 nm/min), and the results are shown in FIG. 5.

Comparative Example

In about 20 mg of NMP was dissolved 200 mg of the dispersant of Chemical Formula 7, and about 20 mg of single-wall carbon nanotubes were added to the solution, followed by dispersing the nanotubes for about 13 hours in a sonic bath (35 kHz, 400W). The solution was centrifuged at about 5,000 rpm for about 10 minutes and at about 8,000 rpm for about 10 minutes to yield a supernatant. This was measured for absorbance at 750 nm through UV-Vis-spectroscopy (JASCO V-560) (Absorbance mode, Scanning speed: 400 nm/min) and the results are shown in FIG. 5.

[Chemical Formula 7]

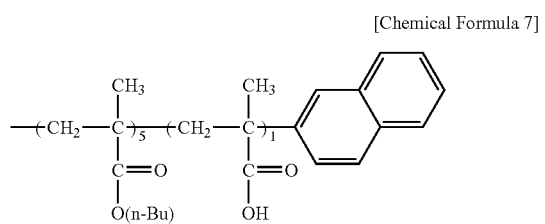

As shown in FIG. 5, a higher absorbance was realized by the dispersant of the present invention than by the dispersant of the Comparative Example, showing that the carbon nanotube was dispersed at a higher concentration. Specifically, the dispersant according to the present invention disperses at about 4 to about 4.5-fold greater efficiency that does the conventional dispersant.

Experimental Example 1

Adsorption Efficiency According to Dispersant

Figure 7:
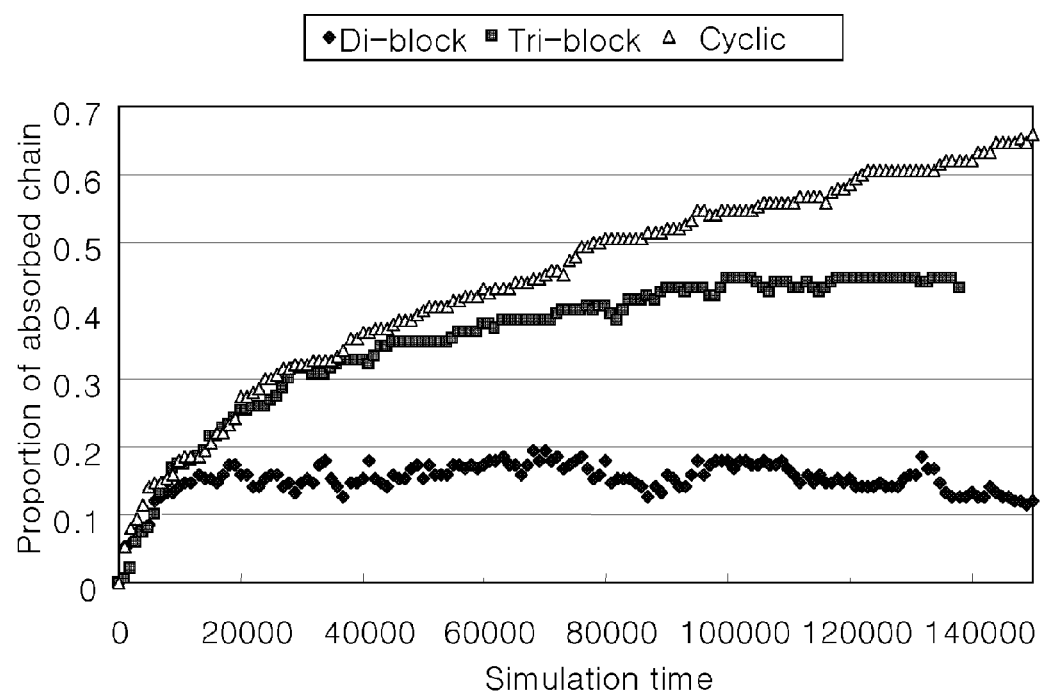
FIG. 7 is a graph in which the properties of the chain adsorbed on carbon nanotubes to the total chain used is plotted against time for a di-block type, a tri-block type, and a cyclic dispersant.

The cyclic dispersant of Chemical Formula 6 (FIG. 6c), a di-block type dispersant (FIG. 6a,) and a tri-block type dispersant (FIG. 6b) were compared with respect to adsorption efficiency and the results are depicted in FIG. 7. In the graph, the proportion of the number of chains adsorbed on carbon nanotubes to the total number of chains used was plotted against time with respect to dispersants.

As seen in FIG. 7, the cyclic type dispersant of the present invention was superior in efficiency of adsorption to carbon nanotubes compared to the di-block type dispersant and the tri-block type dispersant. As for the di-block type dispersant (♦), self-aggregation was observed to predominate over adsorption to carbon nanotubes. The tri-block type dispersant (■) showed better dispersibility at an early stage than did the di-block type dispersant, but its adsorption did not increase with time because it reached saturation within a relatively short period of time. In contrast, the cyclic form makes it difficult for the dispersant (Δ) according to the present invention to form self-aggregates, and is advantageous to adsorption to carbon nanotubes. Accordingly, the amount of the cyclic dispersant adsorbed to carbon nanotubes does not reach saturation within a short time of period, but increases with time.

Experimental Example 2

Test of Cyclic Dispersant for Adsorption on Carbon Nanotube

Figure 8A:
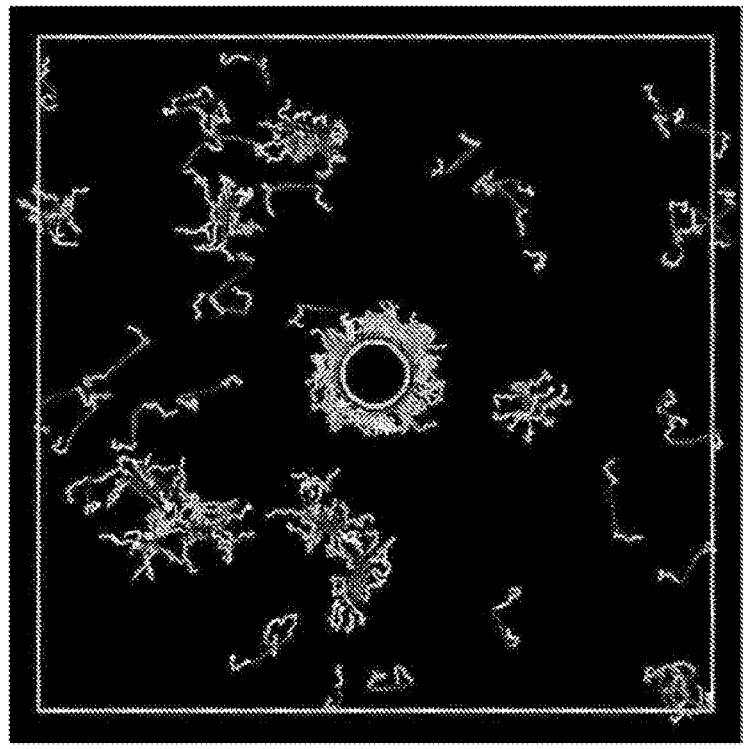
FIGS. 8a and 8b are photographs showing results of simulation tests for adsorption of two dispersants on carbon nanotubes.
Figure 8B:
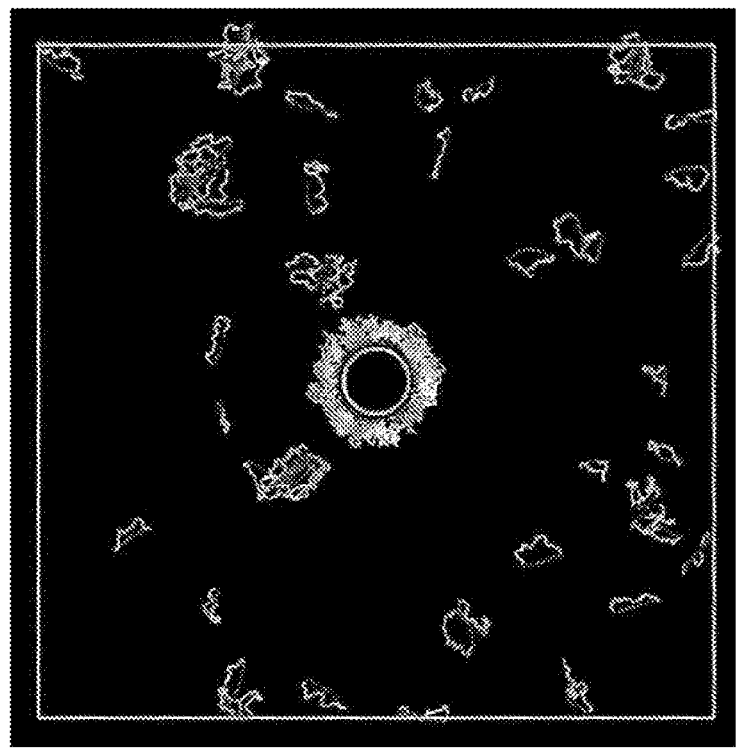

A simulation was conducted for the adsorption of a tri-block type dispersant and a cyclic dispersant to carbon nanotubes, and the results are shown in FIGS. 8a and 8b. The dispersants used in the simulation had the same block composition and the same molecular weight. The chain was also adjusted to have the same number, so that the systems had the same concentration. Simulation results of a tri-block type dispersant and a cyclic dispersant are shown in FIGS. 8a and 8b, respectively.

As shown in FIGS. 8a and 8b, the dispersant of the present invention was observed to be densely adsorbed on carbon nanotubes, while the tri-block type dispersant was only slightly adsorbed on carbon nanotubes, and formed a number of self-aggregates.

The dispersant for carbon nanotubes in accordance with the present invention has a structure which is advantageous with respect to adsorption to carbon nanotubes compared to rigid dispersants or tri-block type dispersants. Accordingly, even a small amount of the dispersant of the present invention can disperse a large quantity of carbon nanotubes.

In addition, serving as a carpet-like layer on carbon nanotubes, the flexible block of the cyclic dispersant causes carbon nanotubes to repel each other. Thus, the dispersant of the present invention can prevent the aggregation of the carbon nanotubes in a dispersion medium, and thus disperse them at a high concentration.

Having a high dispersibility, the carbon nanotube composition of the present invention assures carbon nanotubes of characteristic electrochemical properties and can be formed into a thin film having uniform properties throughout.

Although the present invention has been described herein with reference to the foregoing exemplary embodiments, these exemplary embodiments do not serve to limit the scope of the present invention. Accordingly, those skilled in the art will appreciate that various modifications, additions and substitutions are possible without departing from the scope and technical spirit of the present invention.

What is claimed is:

1. A cyclic dispersant for carbon nanotubes, comprising a rigid block and a flexible block, with a linkage created therebetween, the rigid block being a π-conjugated oligoarylene represented by Chemical Formula 1 or 2, the flexible block being a polyacrylate or a polyethyleneoxide:

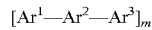  [Chemical Formula 1]

wherein, $Ar^1$, $Ar^2$ and $Ar^3$ are each independently an aryl selected from the group consisting of phenyl, naphthyl, pyrenyl, anthryl, perylenyl and triphenylenyl; and m is an integer from 1 to 4;

  [Chemical Formula 2]

wherein $Ar^1$ and $Ar^2$ are each independently an aryl selected from the group consisting of phenyl, naphthyl, pyrenyl, anthryl, perylenyl, diphenylenyl, triphenylenyl, tetraphenylenyl, pentaphenylenyl, and hexaphenylenyl; and L is selected from the group consisting of ethylene, allene, and a heteroaromatic hydrocarbon having 5 to 30 carbon atoms.

2. The cyclic dispersant as set forth in claim 1, wherein the rigid block is selected from the group consisting of derivatives of oligophenylene, oligothiophene, oligovinylphenylene, and benzene furan.

3. The cyclic dispersant as set forth in claim 1, wherein the flexible block is selected from the group consisting of polymethylmethacrylate, polybutylacrylate, polyacrylic acid, polymethacrylic acid, a copolymer of polyalkylmethacrylate and polymethacrylic acid, polyoxyethylene, polyoxypropylene, polyvinylalcohol, and polyacrylamide.

4. The cyclic dispersant as set forth in claim 1, wherein the cyclic dispersant is selected from the group consisting of compounds represented by Chemical Formulas 3 to 5:

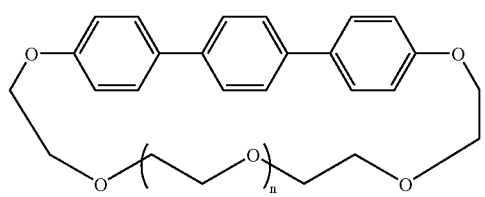

[Chemical Formula 3]

wherein n is an integer from 3 to 6,

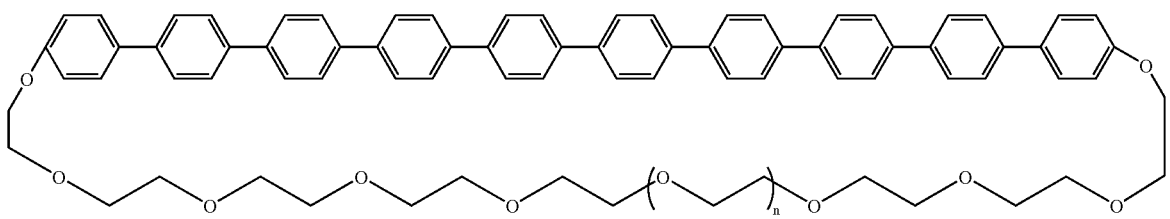

[Chemical Formula 4]

wherein n is an integer from 7 to 15,

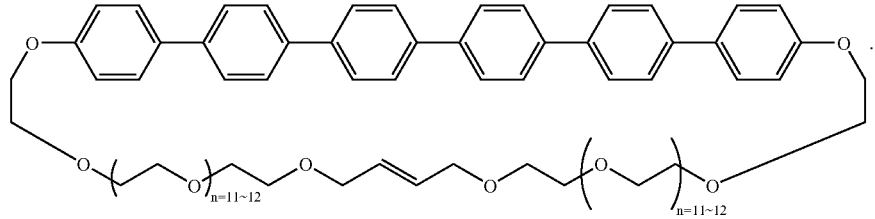

[Chemical Formula 5]

5. The dispersant as set forth in claim 1, having a structure represented by Chemical Formula 6:

[Chemical Formula 6]

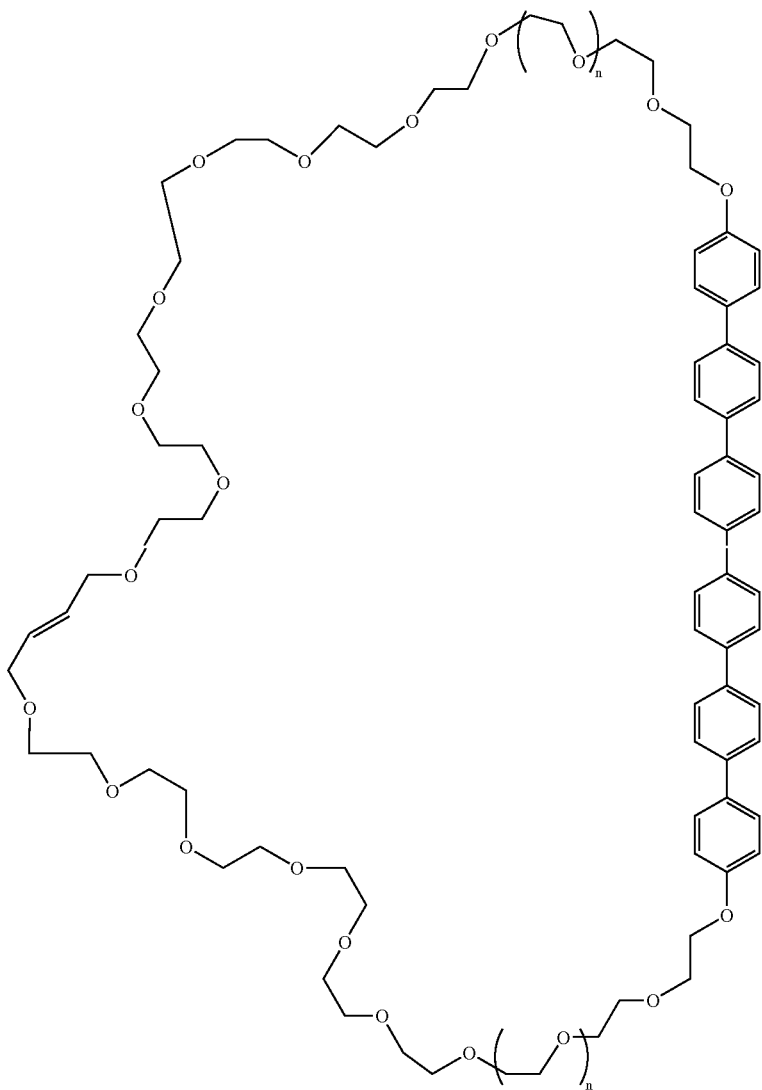

wherein, n is 11.

6. A carbon nanotube composition, comprising the cyclic dispersant of claim 1, a carbon nanotube, and a solvent.

7. The carbon nanotube composition as set forth in claim 6, wherein the composition comprises the dispersant in an amount from about 0.001 to about 10 weight percent, the carbon nanotube in an amount from about 0.01 to about 5 weight percent, with the balance of the weight being the solvent.

8. The carbon nanotube composition as set forth in claim 6, wherein a weight ratio of the carbon nanotube to the dispersant is about 1:0.001 to about 1:10.

9. The carbon nanotube composition as set forth in claim 6, wherein the carbon nanotube is selected from the group consisting of a single-wall carbon nanotube, a double-wall carbon nanotube, a triple-wall carbon nanotube, a quadruple-wall carbon nanotube, a carbon nanohorn, a carbon nanofiber, and combinations thereof.

10. The carbon nanotube composition as set forth in claim 6, wherein the solvent is selected from a group consisting of water, alcohols, ketones, ethylene glycols, propylene glycols, amides, pyrrolidones, hydroxyesters, anilines, hexane, terpineol, chloroform, toluene, propylene glycol monomethyl ether acetate, N-methyl-2-pyrrolidone, and combinations thereof.

* * * * *